US008966361B2

(12) United States Patent
Lee

(10) Patent No.: US 8,966,361 B2
(45) Date of Patent: Feb. 24, 2015

(54) PROVIDING SUMMARY VIEW OF DOCUMENTS

(75) Inventor: David B. Lee, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 289 days.

(21) Appl. No.: 12/960,693

(22) Filed: Dec. 6, 2010

(65) Prior Publication Data
US 2012/0144292 A1    Jun. 7, 2012

(51) Int. Cl.
G06F 17/00    (2006.01)

(52) U.S. Cl.
USPC ........... 715/238; 715/234; 715/235; 715/236; 715/237; 715/239; 715/794; 715/795; 715/796; 715/797; 715/799; 715/800; 715/801; 715/802; 715/803; 715/804

(58) Field of Classification Search
CPC . G06F 17/212; G06F 17/2247; G06F 17/248; G06F 17/30; G06F 3/04812; G06F 3/0484
USPC .......................... 715/815, 234–239, 794–804
See application file for complete search history.

(56) References Cited

U.S. PATENT DOCUMENTS

| | | | |
|---|---|---|---|
| 6,857,102 B1 * | 2/2005 | Bickmore et al. ............ | 715/205 |
| 7,069,506 B2 | 6/2006 | Rosenholtz et al. | |
| 7,345,688 B2 | 3/2008 | Baudisch et al. | |
| 7,739,622 B2 | 6/2010 | DeLine et al. | |
| 2003/0210281 A1 | 11/2003 | Ellis et al. | |
| 2004/0103371 A1 * | 5/2004 | Chen et al. ..................... | 715/513 |
| 2005/0071364 A1 * | 3/2005 | Xie et al. ....................... | 707/102 |
| 2006/0085743 A1 * | 4/2006 | Baudisch et al. ............. | 715/526 |
| 2006/0179051 A1 | 8/2006 | Whitney et al. | |
| 2008/0162505 A1 | 7/2008 | Hill et al. | |
| 2008/0288859 A1 * | 11/2008 | Yuan et al. ..................... | 715/234 |
| 2009/0193337 A1 | 7/2009 | Carter et al. | |
| 2010/0115466 A1 | 5/2010 | Eisen | |

OTHER PUBLICATIONS

Lam et al., "Summary Thumbnails: Readable Overviews for Small Screen Web Browsers" pp. 681-690—Apr. 2005.*
Lam, et al., "Summary Thumbnails:Readable Overviews for Small Screen Web Browsers", Retrieved at << http://citeseerx.ist.psu.edu/viewdoc/download?doi=10.1.1.67.4425&rep=rep1&type=pdf >>, Proceedings of the SIGCHI conference on Human factors in computing systems, Apr. 2-7, 2005, pp. 10.
Berkner, Kathrin, "How small should a document thumbnail be?", Retreived at << http://citeseerx.ist.psu.edu/viewdoc/summary?doi=10.1.1.86.8998 >>, Proceedings of the SPIE, vol. 6076, Feb. 10, 2006, pp. 12.

(Continued)

Primary Examiner — Quoc A Tran
(74) Attorney, Agent, or Firm — Jessica Meyers; Jim Ross; Micky Minhas

(57) ABSTRACT

As part of a document summary view system, a miniaturized version of a document is provided that presents a summary overview of the document over a user interface, enabling a user to easily read and distinguish the contents of the document. The summary view may preserve a basic format and/or layout of a document and may retain the core elements within the document including headings, bulleted lists, tables, images, and/or the first sentence of each paragraph, and obscure any remaining text and elements.

20 Claims, 6 Drawing Sheets

(56) References Cited

OTHER PUBLICATIONS

Buchanan, et al., "Improving Skim Reading for Document Triage", Retrieved at << http://www.cs.swan.ac.uk/~cstomo/publications/IIiX08.pdf >>, Proceedings of the second international symposium on Information interaction in context, 2008, pp. 83-88.

Berkner, et al., "SmartNails—Display and Image Dependent Thumbnails", Retrieved at << http://citeseerx.ist.psu.edu/viewdoc/download?doi=10.1.1.65.6614&rep=rep1&type=pdf >>, 2003, pp. 12.

"First Office Action and Search Report Issued in Chinese Patent Application No. 201110416636.0", Mailed Date: Jan. 6, 2014, 12 Pages.

"Second Office Action and Search Report Issued in Chinese Patent Application No. 201110416636.0", Mailed Date: Sep. 22, 2014, 14 Pages.

\* cited by examiner

PROVIDING SUMMARY VIEW OF DOCUMENTS

BACKGROUND

Viewing documents over a user interface typically involves displaying a complete full length document, which a user views and navigates. Some known document viewing systems involve using reduced size versions or miniaturized versions of documents (also referred to as thumbnails), such that multiple pages of one or more documents can be displayed in a user interface display. Reduced size images or miniaturized versions of documents enable an application to present a set of documents as an array of small images, enabling a user to visually identify a document by viewing the miniaturized version and to navigate between multiple documents.

Another environment, where reduced or miniaturized versions of documents may be used is smaller size displays. With the proliferation of smaller form-factor computing devices such as smart phones or handheld computers, increasingly additional capabilities are added to those devices including viewing and/or editing of documents. Display size limitations make legible presentation of full size documents a challenge.

Typically miniaturized versions of documents reduce an entire document to a much smaller size, retaining most of the original content at a fraction of the original size, such that the content of the document is unrecognizable and unreadable, and thus does not provide a user with any real capability of navigating a document or distinguishing relevant content or information from a document. Providing a user friendly summary view of a document that contains readable and distinguishable content is a challenge when reducing an entire document to a miniature size image for presenting a visual overview of a document.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to producing a reduced size summary view of a document, such that the summary view presents a summarized overview of the document over a user interface, enabling a user to easily read and distinguish contents of the document. According to some embodiments the summary view may preserve the basic format or layout of a document and may retain core elements within the document including headings, bulleted lists, tables, images, first sentence of each paragraph, and similar elements obscuring remaining text and elements.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
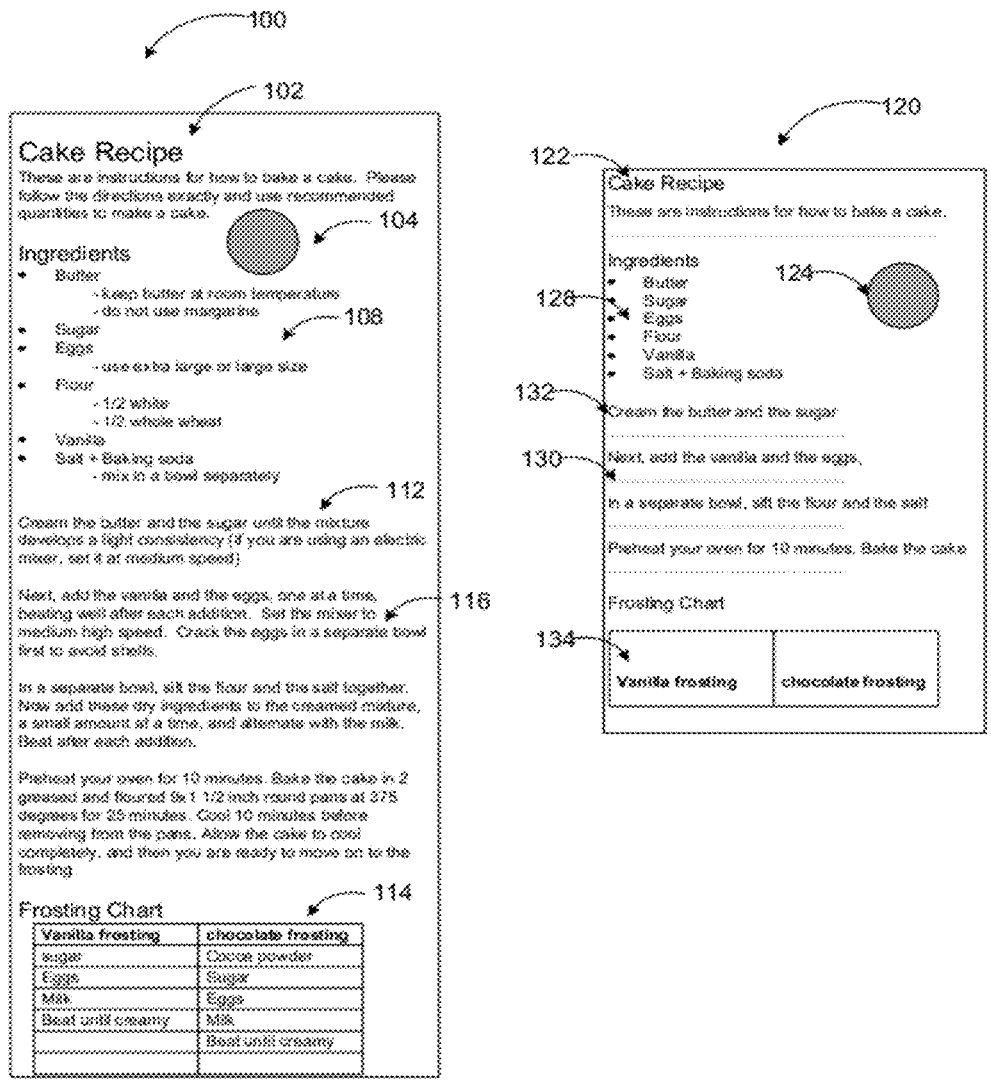
FIG. 1 illustrates a summary view system/environment, where embodiments may be implemented.

As briefly described above, a summary view may present a miniaturized overview of a document to a user over a user interface, enabling a user to read and distinguish the contents of the document. The document summary view may preserve the basic format and layout of a document and may retain select essential and relevant elements within the document including headings, bulleted lists, tables, images, and the first sentence of each paragraph obscuring remaining text and elements. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing a summary view of a document, which may enable a user to distinguish and read the contents of a document on the miniaturized image of the document. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

The term "document" as used herein refers to any file that may be viewed on a display device. Examples of documents include, but are not limited to, word processing documents, spreadsheets, presentation documents, emails, calendars, web pages, graphical documents, reports, and similar ones which may include textual, graphical, and/or image objects.

Referring to FIG. 1, conceptual diagrams 100 and 120 illustrate an original view of a complete document 100 and a summary view of a document 120, which may be displayed over a user interface to a user, where embodiments may be implemented. The user interface, document views and content shown in diagram 100 are for illustration purposes. Embodiments may be implemented in various local, networked, and similar computing environments employing a variety of computing devices and systems. A user interface may provide visual interaction between a user and a computing device, which may run any number of applications including but not limited to word processing applications, spreadsheet applications, presentation applications, internet applications and email applications. A Computing device may be any computing device including, but not limited to, desktop computers, laptop computers, servers, handheld computers, vehicle mount computers, smart phones, touch screen devices, wireless notebooks, and comparable devices.

Some conventional document viewing systems provide miniaturized views of one or more pages of a document to a user in order to facilitate identification and navigation of a document by the user. However, these miniature views are limited in usefulness to the user. The miniature view is typically an image of the document that is reduced in its entirety to a very small image that is a fraction of the size of the original document, resulting in content that is unreadable and not distinguishable by the user due to its small size. Documents with large amounts of text result in miniaturized views with very dense sections of text that do not provide visual differentiation to the user. Additionally, a document that is very long or contains multiple pages may result in a miniaturized image that only displays a small portion of the original document.

In a system according to embodiments, a specialized summary view application, a generic document processing application, or even the operating system of the computing device may provide a summary view version 120 of any document 100 such that a user may view an outline of the contents of an entire document and may easily read and navigate the contents of the document. The summary view of a document may implement a number of reduction and information conveyance schemes.

According to some embodiments, a font typeface, a color, a weight, and/or an alignment of text and/or objects in the original document 100 may be retained for visual recognition. The font size may be normalized to a predetermined minimum readable size for a particular display. The relative font sizes in the summary view may not necessarily be proportional to the relative font sizes of varying text within the original document, but may be normalized to different proportions of reduced font size according to other embodiments. The first line of paragraphs of text (112) in the original document 100 may be retained for legible display in the summary view (132), though the context of the line may be altered to reflow the text in order to reduce a width of the summary view size. Subsequent lines of text (e.g.) 116 within each paragraph may be further reduced in size to a small value (e.g. 1 pixel in height) to act as a placeholder such that the remaining lines (e.g. 130) are obscured from view of a user and the retained elements are emphasized. According to further embodiments, a font color of the remaining lines may be lightened to further obscure those, but convey to the user the fact that there are additional lines in the original document 100.

Additionally, a buffer line (e.g. 1 white pixel high) may be positioned above and/or below the obscured text for emphasizing the retained elements for a more distinguishable view. Other elements, including but not limited to, images, tables, table headings, and/or first level of bullets in a bulleted list may be retained, while remaining objects, including text, captions, subsequent tables, or subsequent levels of bulleted lists may be reduced in size to obscure those from the user's view.

In the example transformation of FIG. 1, title 102 of the original document 100 may be retained as title 122 in the summary view 120 with same font typeface, color, weight, and/or alignment, but reduced size. Similarly, image 104, top level elements of bulleted lists (e.g. 108), first lines of paragraphs (e.g. 112), and heading rows of tables (e.g. table 114) may also be retained in the summary view as image 124, bulleted lists 128, first sentences of paragraphs (e.g. 132), and reduced table 134. Remaining contents of the document may be reduced to a minimal size such that they are obscured from the user's view in the summary view 120. According to some embodiments, providing a summary view 120 of a document 100, which maintains the basic format of the original document may be achieved by identifying the layout of the original document, selecting elements to be retained, and reducing the remaining elements to a size such that the remaining text is essentially illegible to the user in the summary view 100.

Once the thumbnail summary view of the document is provided to the user, the user may view an outline of an entire document and may skim through the contents of the document by reading relevant headings, bulleted lists and the first lines of the paragraphs. By retaining the first line of each paragraph of dense text, the user may easily navigate a document and identify the contents by jumping from paragraph to paragraph reading only the first line of each paragraph and ignoring the subsequent text.

The example summary view transformation in FIG. 1 has been described with specific document elements, user interface presentations, and configurations. Embodiments are not limited to these example configurations. A system providing summary view reduction of documents may be implemented in configurations employing fewer or additional components and performing other tasks.

Figure 2:
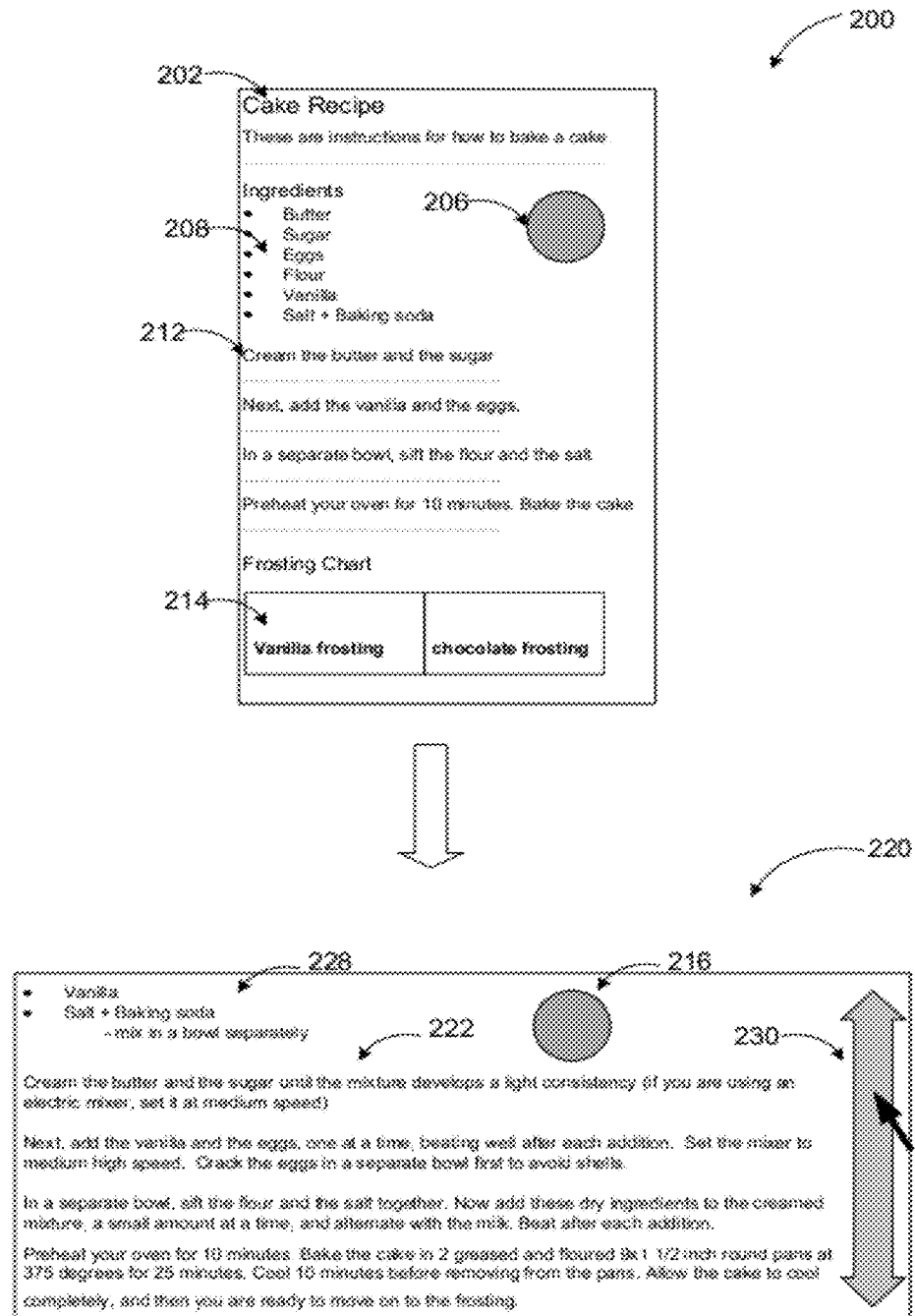
FIG. 2 illustrates an example of a summary view system, employing an orientation mode.

FIG. 2 illustrates an example environment where a document summary view is provided based on an orientation mode of a user interface. According to some embodiments, a user's interaction with a summary view of a document may be aided automatically based on an orientation of the display. A user may view a document on a portable display such as a handheld device, a vehicle mount device, or smart phone. Depending on which orientation the device's display is being used, more horizontal or vertical space may be available to display the document. Thus, the device may be configured to switch from a summary view to a full view (or one between the two versions) automatically upon change of orientation (e.g. based on user flipping the device).

Summary view 200 of the document may be presented in a vertical orientation (also referred to as "portrait") because a width of the physical display may not allow the full document to be displayed. In the summary view 200, some of the example reduced elements of FIG. 1 are shown such as title 202, reduced bulleted list 208, image 206, first lines of paragraphs 212, and reduced table 214.

When the orientation of the display changes and more width room is available, the view may be changed from summary view 200 to full view 220. In the full view 220, reduced bullet list 228 may be expanded to present all list elements, lines of paragraphs in addition to the first line may also be presented (222), as well as image 216 and expanded tables (not shown). Because a height of the smaller form-factor display is unlikely to cover the entire document, a scroll function 230 may be provided (e.g. through a touch-based activation, a button, or other input mechanism) enabling a user to scroll up or down and navigate through the entire document.

Figure 3:
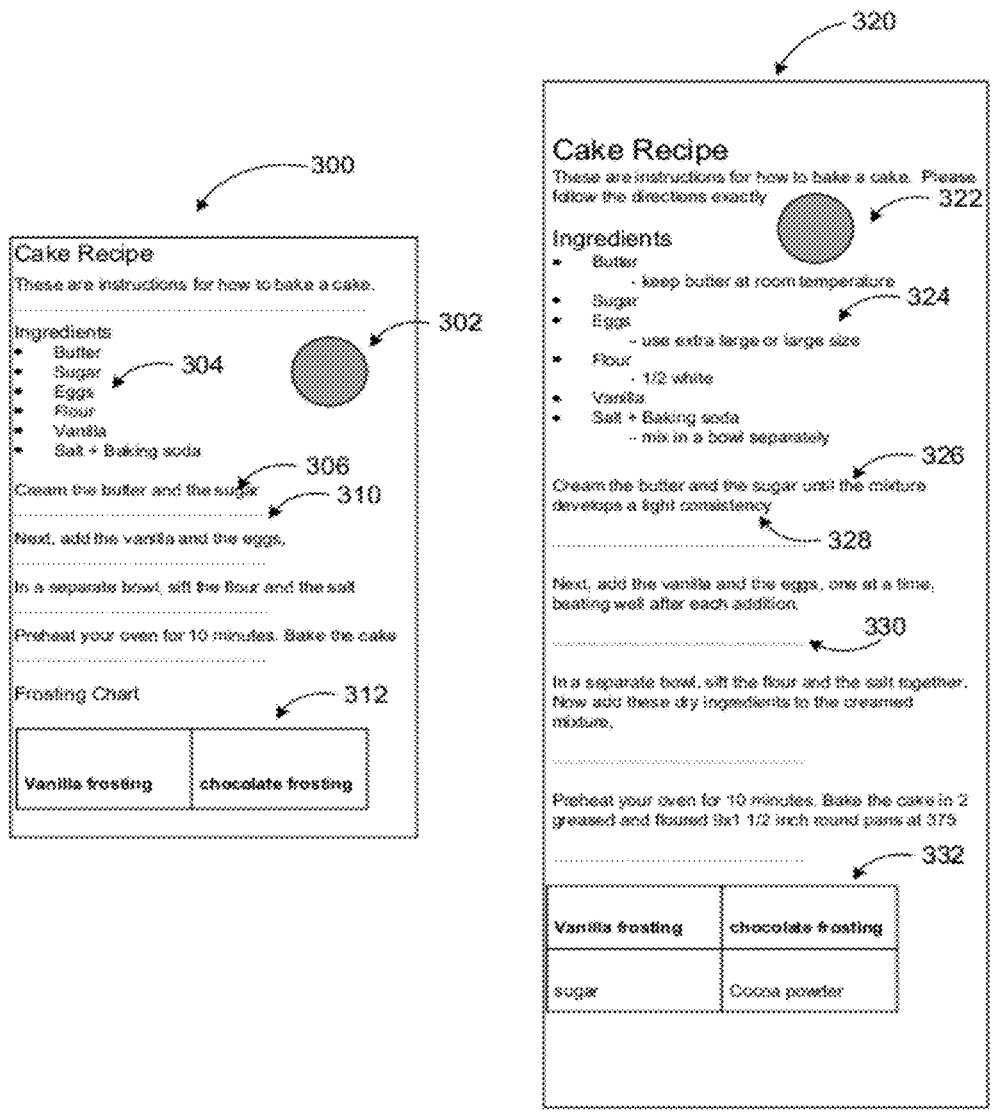
FIG. 3 illustrates another example of a summary view system, employing a continuous zooming mode.

Embodiments are not limited to orientation change in portable computing devices. Automatic summary view—full view transformation based on orientation change may be implemented on any display including, but not limited to regular computer displays, billboard style displays, and similar ones. Furthermore, the automatic transformation may also be performed in response to other display changes, for example, change of available display area on a desktop. Moreover, Examples summary view—full view transformation may be applied to word processing documents, spreadsheets, presentation documents, emails, calendars, web pages, graphical documents, reports, and similar ones which may include textual, graphical, and/or image objects FIG. 3 illustrates another example environment where a document summary view may be provided based on a zooming mode according to some embodiments. A summary view may not be limited to a binary implementation that includes a full view and a summary view of a document. According to some embodiments, a gradual summary view may be provided depending on the available space for displaying a document. For example, a user may reduce or enlarge an application user interface displaying a document. In typical scenarios, the change in size would be handled by modifying text flow or adjusting the displayed size of the entire document (e.g. font sizes, etc.), which may not provide satisfactory results to users especially in small form-factor displays.

According to the example scenario in FIG. 3, a small summary view 300 of a document includes reduced versions of document elements such as image 302, reduced bullet list 304, first line of paragraphs 306 followed by illegible lines 310 indicating to the user that there are more lines following the first line, and reduced table 312. In response to an increase in available display space, a larger summary view 320 of the same document may include image 322, a partial bullet list 324, partial paragraphs (with first line 326, second line 328, and illegible line 330), and partial table 332.

Partial bullet list 324 may include more elements than reduced bullet list 304, for example, some or all of the lower level bullet items. Although not shown, some of the schemes may be integrated. For example, partial bullet list 324 may list all top level items and the first of each of the lower level items followed by an illegible line (e.g. 1 pixel high) indicating that there are additional items not shown in the list. Depending on the available space, a second/third/fourth/etc. line of each paragraph may also be includes in legible format followed by the illegible line indicating that there are more lines. Partial table 332 may include one or more additional rows (or columns) to provide additional information to the user.

According to other embodiments, a user may be enabled to zoom on a particular portion of the displayed document and more elements in that region may be displayed while elements in other regions of the document are left in the smallest summary view mode. Moreover, the transformation may be bidirectional (i.e., summary view may be reduced or enlarged adding or removing elements). Text flow may also be used in both operations. The zoom/shrink and/or orientation changes may be automatic in response to external changes (e.g., the way the device is being held), a user interface control selection (e.g., a button), or user gestures detected through a touch-capable screen, a touch device, or visual detection.

The examples in FIG. 1 through 3 have been described with specific user interface elements, techniques, applications, configurations, and presentations. Embodiments are not limited to systems according to these example configurations. Providing a summary view of a document may be implemented in configurations using other types of user interface elements, techniques, applications, presentations, and configurations in a similar manner using the principles described herein.

Figure 4:
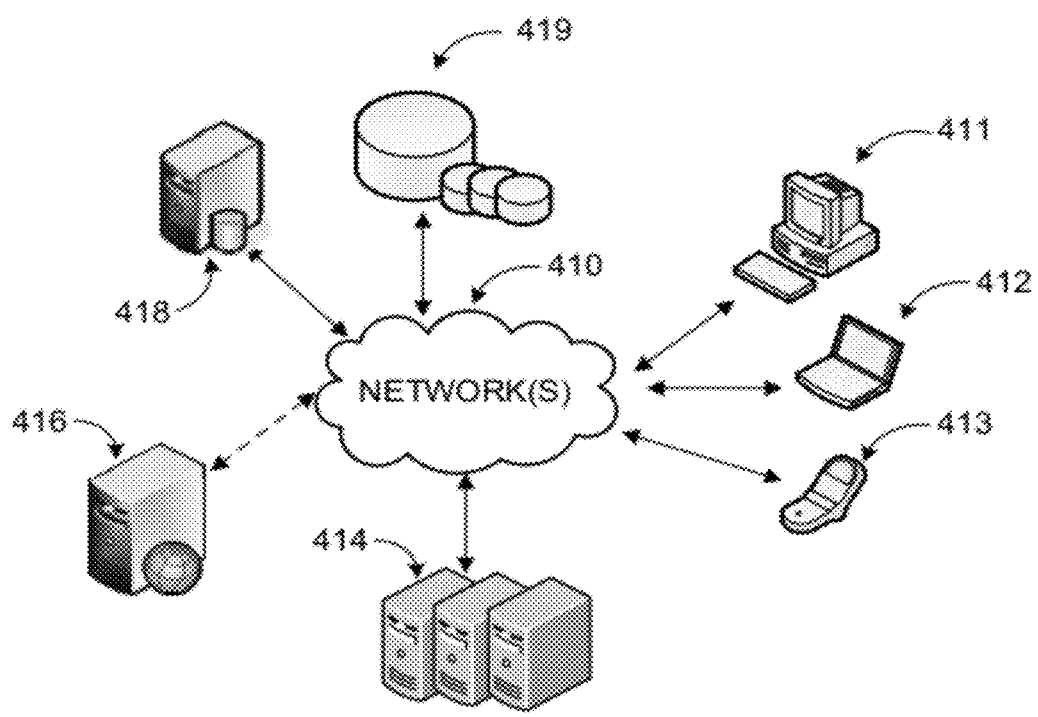
FIG. 4 is a networked environment, where a system according to embodiments may be implemented.

FIG. 4 is an example networked environment, where embodiments may be implemented. A system for providing a summary view of a document may be implemented via software executed over one or more servers 414 such as a hosted service. The platform may communicate with client applications on individual computing devices such as a smart phone 513, a laptop computer 412, or desktop computer 411 ('client devices') through network(s) 410.

Client applications executed on any of the client devices 411-413 may facilitate communications via application(s) executed by servers 414, or on individual server 416. A summary view application executed on one of the servers may facilitate the reduction of a document for presentation as a document summary view. The application may provide for retaining select elements of the context of a document and reducing remaining elements of the context such that they are obscured from the user's view in a summary view. The summary view application may retrieve relevant data from data store(s) 419 directly or through database server 418, and provide requested services (e.g. document editing) to the user(s) through client devices 411-413.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Figure 5:
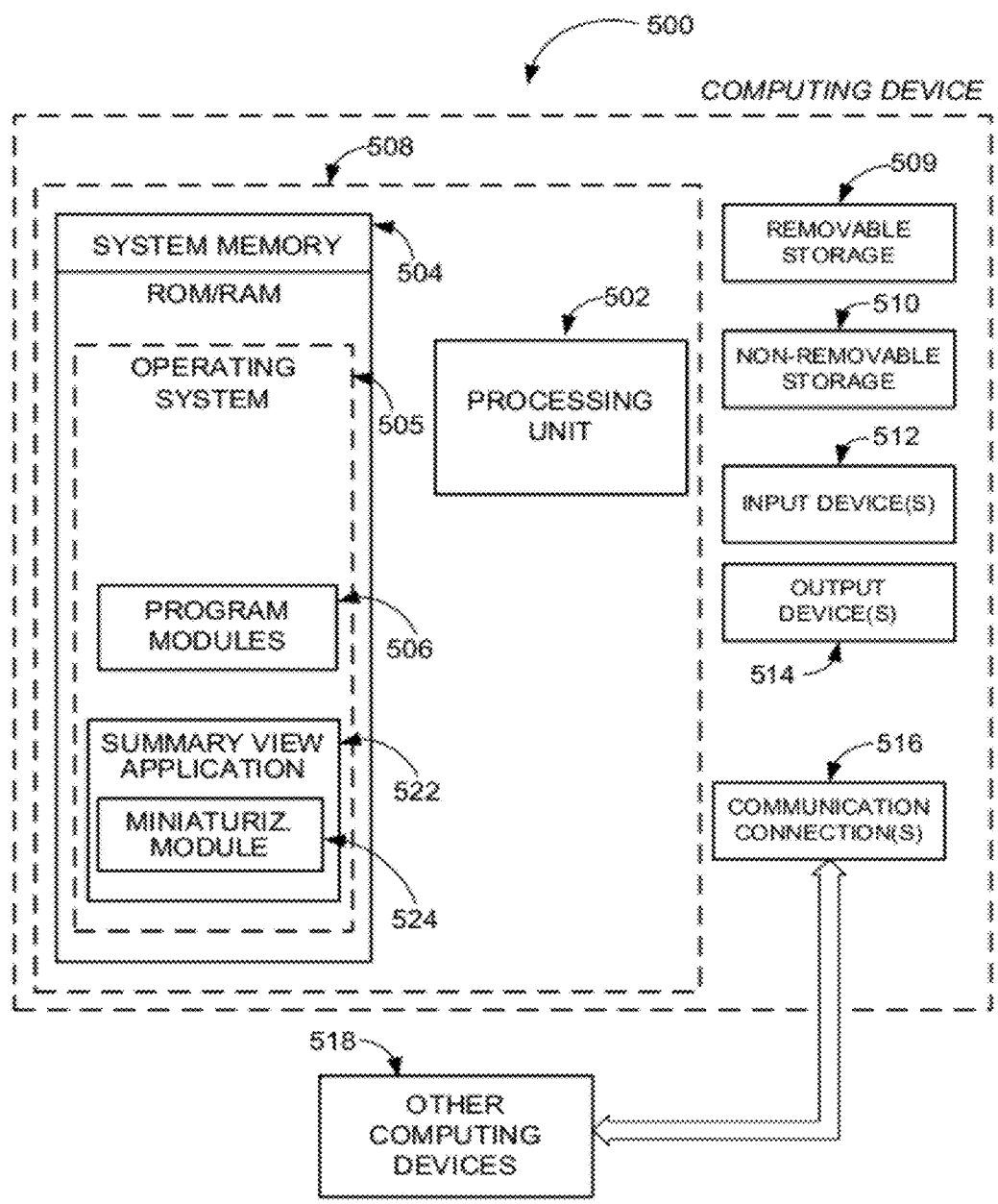
FIG. 5 is a block diagram of a summary view system where embodiments may be implemented.

Many other configurations of computing devices, applications, data sources, and data distribution systems may be employed to implement a platform providing a summary view of a document. Furthermore, the networked environments discussed in FIG. 5 are for illustration purposes only. Embodiments are not limited to the example applications, modules, or processes.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing an application capable of presenting a document summary view according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, application 522 and miniaturization module 524.

Application 522 may enable a user to view a summary view of the context of a document. Through a user interface controlled by a miniaturization module 524, application 522 may reduce a complete original document to a miniature image, where basic layout and select elements of the original document are retained, and remaining elements and context are reduced such that they are obscured from the user's view in the summary view of the document. Application 522 and miniaturization module 524 may be separate applications or integrated modules of a hosted service. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
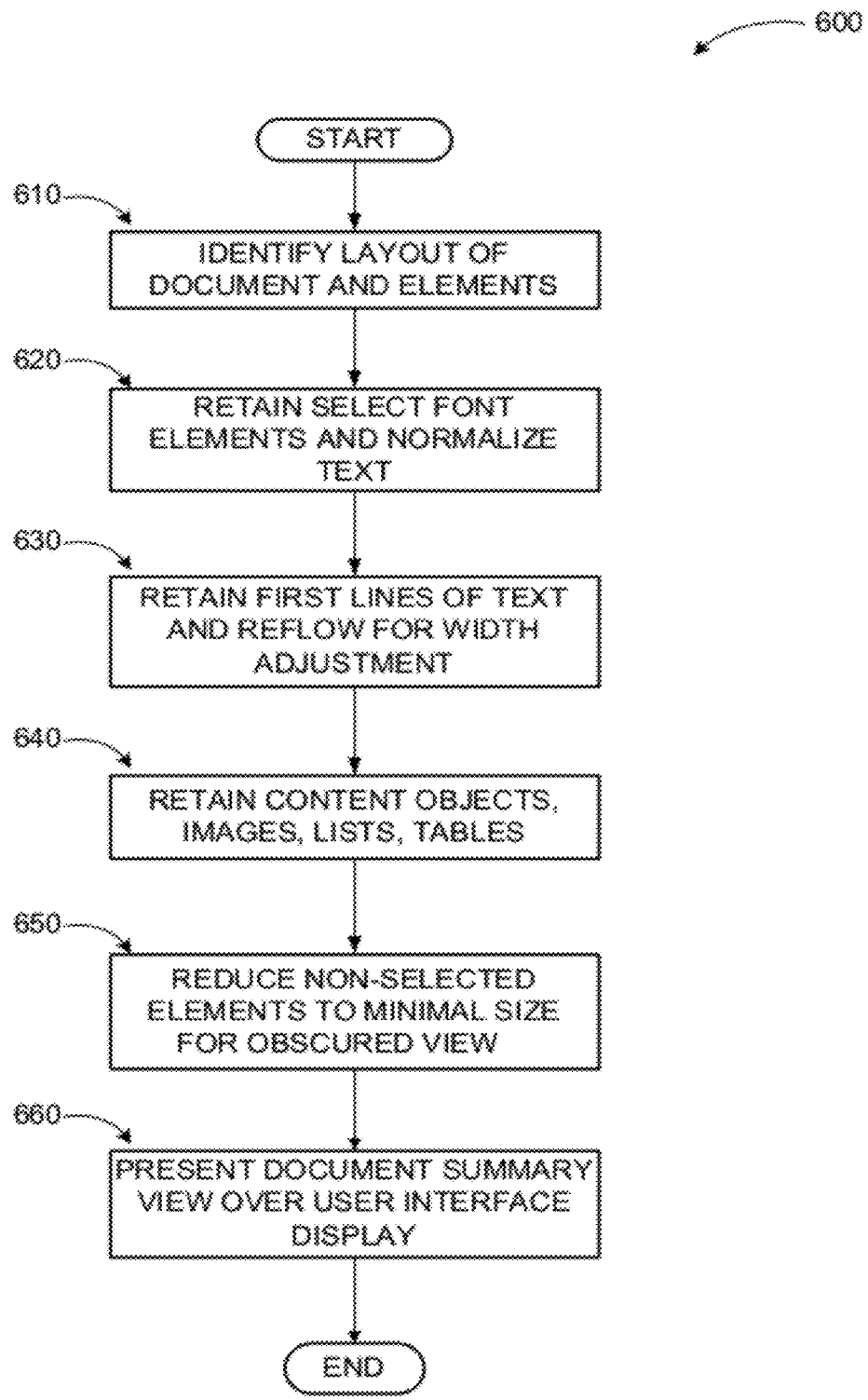
FIG. 6 illustrates a logic flow diagram for a process of providing a summary view of a document by retaining some elements and obscuring other elements of a document, according to embodiments.

FIG. 6 illustrates a logic flow diagram for process 600 of providing a summary view of a document according to embodiments. Process 600 may be implemented on a server or other computing device.

Process 600 begins with operation 610, where the basic layout and format of the document are identified and the elements that may be retained in the document summary view are determined. In a document summary view system, certain elements and document context may be retained while other elements may be hidden from the user in the document summary view. At operation 620, certain aspects of the elements may be retained including but not limited to font typeface, color, weight, and/or alignment; and the font size of all of the text within a document may be normalized to a predetermined user-readable size for the document summary view. The font size of retained text may be normalized such that a correlation of larger and smaller font size text is maintained, while a placement of largest amount of readable content on the screen is optimized.

Upon normalizing the font size, at operation 630, the first line of each paragraph within the document may be retained for display in the summary view. The text in each line may be altered such that the flow of the text within a line is lengthened or shortened to optimally fit the width of the document summary view. At operation 640, any images, tables and table headings, and first levels of bulleted lists are retained for display in the summary view.

At operation 650, remaining lines of text within a paragraph, table, and bulleted lists may be reduced so that they are effectively invisible to the user in the document summary view. This may be accomplished by reducing the remaining contents to a 1 pixel height, lightened in color, and/or surrounded above and below by 1 white pixel, for example. Thus, the text is obscured from the view of the user in the summary view and is not distinguishable by the user. At operation 660, the document summary view may be displayed to the user preserving the layout and structure of the original document, and presenting an outline view of a document that is identifiable and readable. Since the first line of each paragraph is readable, documents composed primarily of text have more visual differentiation for a user and the user may easily scan a document for particular information and navigate to a particular portion of a document.

The operations included in process 600 are for illustration purposes. Providing a summary view of a document may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing a document summary view, the method comprising:
    identifying a layout and a format of a document viewed on a device;
    identifying a type of device, an orientation of the device, and available display space on a user interface of the device;
    selecting core visual elements of the document for producing a summary view of the document;
    creating the summary view by:
        retaining at least a portion of the layout and the format of the selected core visual elements;
        obscuring remaining visual elements;
        using text flow while retaining the portion of the layout and obscuring the remaining visual elements;
    displaying the summary view of the document over the user interface based on the type and orientation of the device and the available display space on the user interface of the device;
    modifying the summary view and the available display space in response to one or more of a reduction of the user interface and an enlargement of the user interface;
    transitioning the document between a full view to the summary view based on the modified available display space, wherein one or more of the obscured visual elements are displayed in transitional summary views; and
    providing a scroll function for enabling navigation through the document by scrolling up and down on the user interface.

2. The method of claim 1, wherein the core visual elements include at least one from a set of: a heading, a first line of each paragraph, an image, a heading row of a table, a table identifier, and a first level item of a bulleted list.

3. The method of claim 1, further comprising:
    retaining at least one from a set of: a font typeface, a font color, a font weight, and a text alignment of the core visual elements.

4. The method of claim 1, further comprising:
    normalizing a font size of retained text such that a correlation between font size text is maintained, while optimizing a placement of amount of readable content on a screen of the device.

5. The method of claim 4, wherein a font size proportion among different font size text of the core visual elements is modified as part of the normalization.

6. The method of claim 1, further comprising:
    altering retained textual elements by one of: lengthening and shortening a line of text to optimally fit a width of the summary view.

7. The method of claim 1, wherein obscuring the remaining visual elements comprises reducing the remaining visual elements to a size that renders them illegible in the summary view.

8. The method of claim 7, wherein the remaining visual elements are reduced to a height comprising one of one, two, three and four pixels.

9. The method of claim 7, further comprising:
    inserting a buffer line at least one of above and below each obscured text line.

10. The method of claim 1, further comprising:
    displaying the summary view in response to one of: a change in a display orientation, a change in available display area, and a user gesture indicating one of a zoom and a shrink action.

11. The method of claim 1, wherein obscuring the remaining visual elements further comprises modifying a font color of the remaining visual elements to a lighter color in the summary view.

12. A computing device for providing a document summary view, comprising:
    a memory storing instructions;
    a processor coupled to the memory, the processor executing at least one document processing application in conjunction with instructions stored in the memory, wherein a miniaturization module of the document processing application is configured to:
        identify a layout and a format of a full view of a document for viewing on a display device;
        identify a type of the display device, an orientation of the display device, and an available display space on a user interface of the display device;
        select core visual elements of the document for producing a summary view of the document;
        retain at least one from a set of: a font typeface, a font color, a font weight, and a text alignment of the core visual elements;
        obscure remaining visual elements by reducing the remaining visual elements to a size that renders them illegible in the summary view;
        send the summary view to the display device;
        display the summary view of the document over the user interface based on the type and orientation of the device and the available display space on the user interface of the device;
        modify the summary view and the available display space in response to one or more of a reduction of the user interface and an enlargement of the user interface;
        enable the document to be gradually transitioned between a full view and the summary view of the document based on the modified available display space, such that transitional summary views are provided wherein one or more, but not all, of the obscured visual elements are displayed in the transitional summary views; and
        in response to a change on the available display space, add at least one reduced remaining visual element into the core visual elements for an increased available display space and remove at least one core element into the reduced remaining core elements for a reduced available display space.

13. The computing device of claim 12, wherein the module is further configured to automatically transition between the summary view and the full view of the document on the display device based on the available display space on a the displayed user interface.

14. The computing device of claim 13, wherein the computing device is a portable computing device and the available display space on the displayed user interface is determined automatically based on an orientation of the computing device.

15. The computing device of claim 12, wherein the miniaturization module is further configured to restore a portion of core and remaining visual elements in a user selected region of the summary view in a zoom mode.

16. The computing device of claim 15, wherein the miniaturization module is further configured to obscure lower level items in a bulleted list and other-than-first row cells in a table by reducing the lower level items and contents of the other-than-first row cells to a size that renders them illegible in the summary view.

17. A method to be executed on a computing device for providing a document summary view, the method comprising:

identifying a layout and a format of a document in a full view for viewing on a display device;

identifying a type of the display device, an orientation of the display device, and an available display space on a user interface of the display device;

selecting core visual elements of the document for producing a summary view of the document;

creating the summary view by:
retaining at least one from a set of: a font typeface, a font color, a font weight, and a text alignment of the core visual elements;

obscuring at least a portion of remaining visual elements by reducing the portion of the remaining visual elements to a size that renders them illegible in the summary view;

retaining another portion of the remaining visual elements based on available display space on a displayed user interface;

using text flow while retaining the core visual elements, obscuring the portion of the remaining visual elements, and retaining the other portion of the remaining visual elements based on the available display space;

displaying the summary view of the document over the user interface based on the type and orientation of the device and the available display space on the user interface of the device;

modifying the summary view and the available display space in response to one or more of a reduction of the user interface and an enlargement of the user interface;

transitioning the document between a full view to the summary view based on the modified available display space, wherein one or more of the obscured visual elements are displayed in transitional summary views;

enabling a user to zoom on a portion of the document for viewing elements of the zoomed portion in the full view while elements in other portions of the document remain obscured in the summary view; and in response to a change on the available display space, adding at least one of the reduced portion of the remaining visual elements into the core visual elements for an increased available display space and removing at least one core element into the reduced portion of the remaining core elements for a reduced available display space.

18. The method of claim 17, wherein the core visual elements include at least one from a set of: a heading, a first line of each paragraph, an image, a heading row of a table, a table identifier, and a first level item of a bulleted list; and the retained remaining elements include at least one from a set of: a second line of each paragraph, a second level item of a bulleted list, and a second row of a table.

19. The method of claim 17, wherein the instructions further comprise:

bidirectionally transforming the full view of the document to the summary view and the summary view to the full view in response to one of a change in the available display space of the user interface, a change in orientation of a portable computing device displaying the user interface, and a gesture indicating one of a partial and a complete zoom.

20. The method of claim 17, wherein the document includes one of: a word processing document, a spreadsheet, a presentation document, an email, a calendar, a web page, a graphical document, and a report.

* * * * *